(12) United States Patent
Akabane et al.

(10) Patent No.: US 10,860,109 B2
(45) Date of Patent: Dec. 8, 2020

(54) TACTILE PRESENTATION DEVICE

(71) Applicant: FUJITSU COMPONENT LIMITED, Tokyo (JP)

(72) Inventors: Ayumu Akabane, Tokyo (JP); Naoki Shimizu, Tokyo (JP); Fumio Takei, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/549,095

(22) Filed: Aug. 23, 2019

(65) Prior Publication Data

US 2020/0081542 A1 Mar. 12, 2020

(30) Foreign Application Priority Data

Sep. 12, 2018 (JP) ................................ 2018-170297

(51) Int. Cl.
| | |
|---|---|
| *G06F 3/01* | (2006.01) |
| *G01H 11/06* | (2006.01) |
| *G06F 3/041* | (2006.01) |
| *B06B 1/06* | (2006.01) |

(52) U.S. Cl.
CPC ............. *G06F 3/016* (2013.01); *G01H 11/06* (2013.01); *G06F 3/041* (2013.01); *B06B 1/06* (2013.01)

(58) Field of Classification Search
CPC .......... G06F 3/016; G06F 3/041; G01H 11/06
USPC ...................................................... 340/407.1
See application file for complete search history.

(56) References Cited

U.S. PATENT DOCUMENTS

| | | | | |
|---|---|---|---|---|
| 2011/0241851 | A1* | 10/2011 | Henderson | ................ B06B 1/16 340/407.1 |
| 2011/0262126 | A1* | 10/2011 | Kawai | ................ G02B 27/0006 396/529 |
| 2012/0162500 | A1* | 6/2012 | Yoshida | ................ G03B 17/02 348/373 |
| 2012/0313874 | A1* | 12/2012 | Chappaz | ............. H01L 41/0805 345/173 |
| 2014/0327839 | A1* | 11/2014 | Giraud | ................. G06F 3/0412 349/12 |

(Continued)

FOREIGN PATENT DOCUMENTS

| | | |
|---|---|---|
| JP | 8-236831 | 9/1996 |
| JP | 2008-91971 | 4/2008 |

(Continued)

OTHER PUBLICATIONS

Patenscope English abstract for International Patent Publication No. WO 2015/045059 A1, published Apr. 2, 2015.

(Continued)

*Primary Examiner* — Kerri L McNally
(74) *Attorney, Agent, or Firm* — Staas & Halsey LLP

(57) ABSTRACT

A tactile presentation device includes: a substrate including a vibration plate and a terminal plate which are integrally formed; an actuator that is provided on the vibration plate, and generates a standing wave of ultrasonic vibration; a terminal that is provided on an end of the terminal plate, and electrically connects the actuator to an external; a fixing member that fixes the vibration plate to a support; and a vibration suppressor that is provided between the terminal and the fixing member, and suppresses the ultrasonic vibration transmitted from the vibration plate to the support.

8 Claims, 15 Drawing Sheets

(56) References Cited

U.S. PATENT DOCUMENTS

| | | | | |
|---|---|---|---|---|
| 2014/0347322 A1* | 11/2014 | Kamata | ............... | G06F 3/041 |
| | | | | 345/174 |
| 2016/0313796 A1* | 10/2016 | Kim | ............... | H04R 17/10 |
| 2017/0090575 A1* | 3/2017 | Kohata | ............... | G06F 3/0488 |
| 2018/0039331 A1* | 2/2018 | Warren | ............... | G06F 3/043 |
| 2018/0329499 A1* | 11/2018 | Taninaka | ............... | G06F 3/016 |
| 2018/0348873 A1* | 12/2018 | Shiroto | ............... | G06F 3/016 |

FOREIGN PATENT DOCUMENTS

| | | |
|---|---|---|
| JP | 2017-68709 | 4/2017 |
| WO | WO 2015/045059 A1 | 4/2015 |

OTHER PUBLICATIONS

Toshio Watanabe et al., "Control of Tactile Surface-Roughness Sensation Using Ultrasonic Vibration", Transactions of the Japan Society of Mechanical Engineers, Series C, vol. 62, Issue 596, Apr. 25, 1996, pp. 1329-1334.

Fujitsu Limited, Fujitsu Laboratories Ltd., "Fujitsu Develops Prototype Haptic Sensory Tablet", Press Release, Feb. 24, 2014, https://pr.fujitsu.com/jp/news/2014/02/24.html, 6 pp.

\* cited by examiner

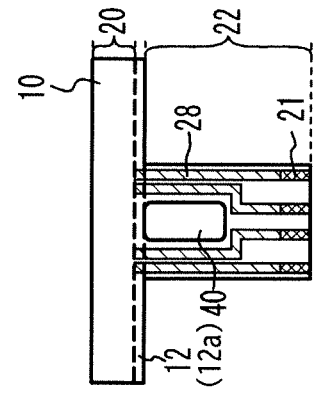
FIG. 10A
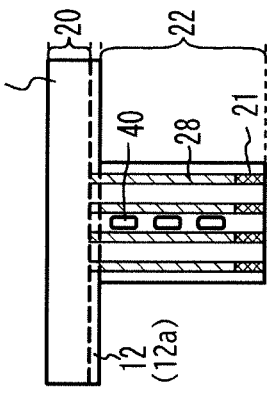
FIG. 10C
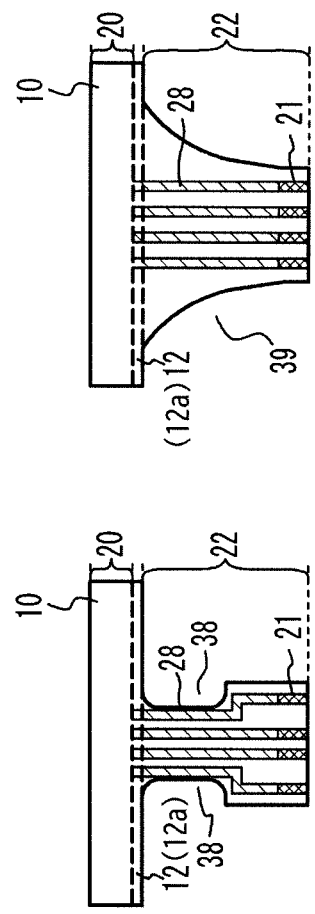
FIG. 10B
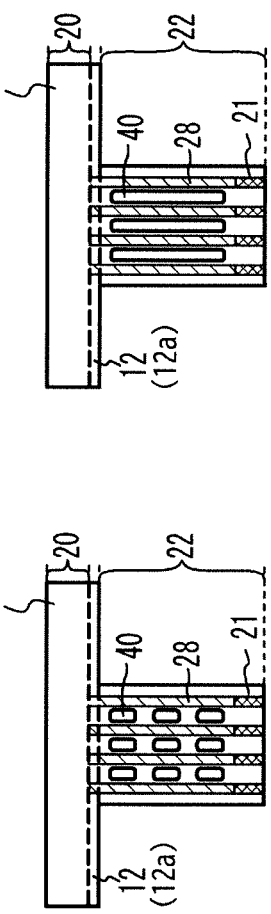
FIG. 10E
FIG. 10D
FIG. 10F

TACTILE PRESENTATION DEVICE

CROSS-REFERENCE TO RELATED APPLICATION

This application is based upon and claims the benefit of priority of the prior Japanese Patent Application No. 2018-170297 filed on Sep. 12, 2018, the entire contents of which are incorporated herein by reference.

FIELD

A certain aspect of the embodiments is related to a tactile presentation device that presents a tactile feeling by adding vibration of an ultrasonic band, for example.

BACKGROUND

It is known to give a tactile feeling to a user by applying a standing wave of the ultrasonic vibration to a vibration plate by using an actuator (see Patent Document 1: International Publication Pamphlet No. 2015/045059). It is known that a piezoelectric vibration plate and a terminal body are bonded with a flexible resin bonding material (see Patent Document 2: Japanese Laid-open Patent Publication No. 2008-091971). There is known a piezoelectric transformer supporting tool that includes grooves for leading lead wires provided at positions corresponding to vibration nodes (see Patent Document 3: Japanese Laid-open Patent Publication No. 08-236831, for example).

SUMMARY

According to an aspect of the present invention, there is provided a tactile presentation device includes: a substrate including a vibration plate and a terminal plate which are integrally formed; an actuator that is provided on the vibration plate, and generates a standing wave of ultrasonic vibration; a terminal that is provided on an end of the terminal plate, and electrically connects the actuator to an external; a fixing member that fixes the vibration plate to a support; and a vibration suppressor that is provided between the terminal and the fixing member, and suppresses the ultrasonic vibration transmitted from the vibration plate to the support.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 10A to 10F are plane views of the terminal plate of the tactile presentation device according to a fifth embodiment;

DESCRIPTION OF EMBODIMENTS

In the Patent Document 1, when a terminal for supplying an electric power is provided on the actuator, the vibration is transmitted to a housing through the terminal. The following embodiments explain a tactile presentation device that can suppress the leakage of the vibration through the terminal.

Hereinafter, a description will be given of embodiments with drawings.

First Embodiment

Figure 1:
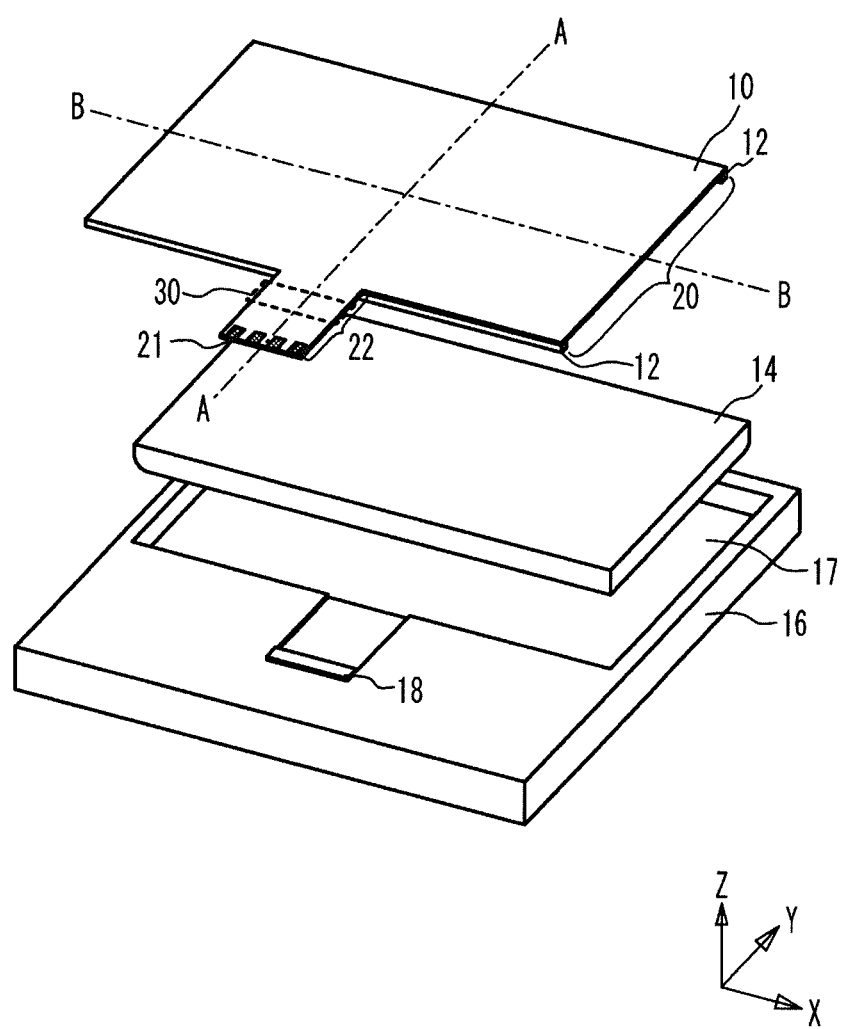
FIG. 1 is a perspective view of a tactile presentation device according to a first embodiment.
Figure 2A:
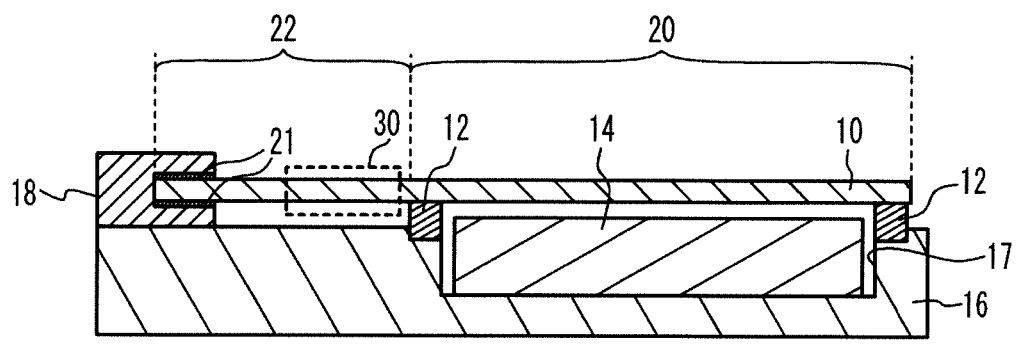
FIG. 2A is a cross-section diagram taken on a line A-A of FIG. 1.
Figure 2A:
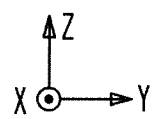
Figure 2B:
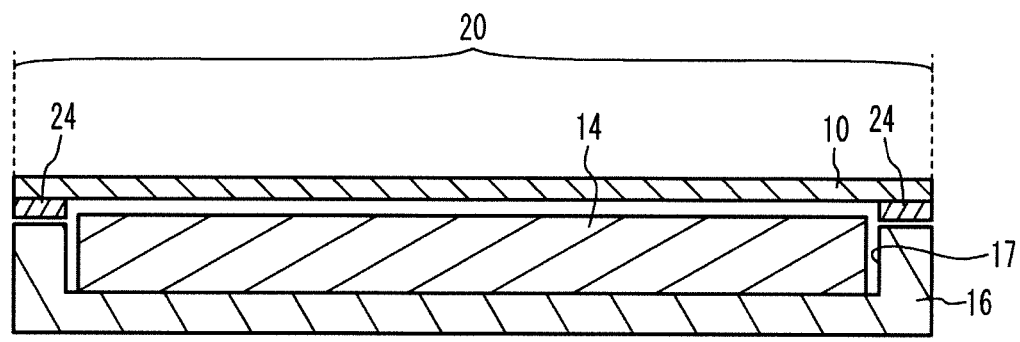
FIG. 2B is a cross-section diagram taken on a line B-B of FIG. 1.
Figure 2B:
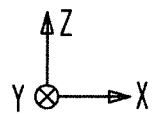

FIG. 1 is a perspective view of a tactile presentation device according to a first embodiment. FIG. 2A is a cross-section diagram taken on a line A-A of FIG. 1, and FIG. 2B is a cross-section diagram taken on a line B-B of FIG. 1. A plane direction of a substrate 10 is represented as an X-direction and a Y-direction, and a normal direction of the substrate 10 is represented as a Z-direction, as illustrated in FIGS. 1, 2A and 2B. A recess 17 is provided in a housing 16 as a support, and a touch panel 14 is housed in the recess 17. The substrate 10 is disposed on the touch panel 14. The substrate 10 includes a vibration plate 20 and a terminal plate 22 which are formed integrally. Fixing members 12 extending in the X-direction are provided at both ends of a back surface of the vibration plate 20 of the substrate 10 in the Y-direction. The substrate 10 is fixed to the housing 16 by the fixing members 12. Terminals 21 are provided on an end of the terminal plate 22. The terminals 21 are inserted into a connector 18, so that they are electrically connected to the housing 16. Piezoelectric elements 24 as actuators are provided at both ends of the back surface of the vibration plate 20 in the X-direction.

Figure 3:
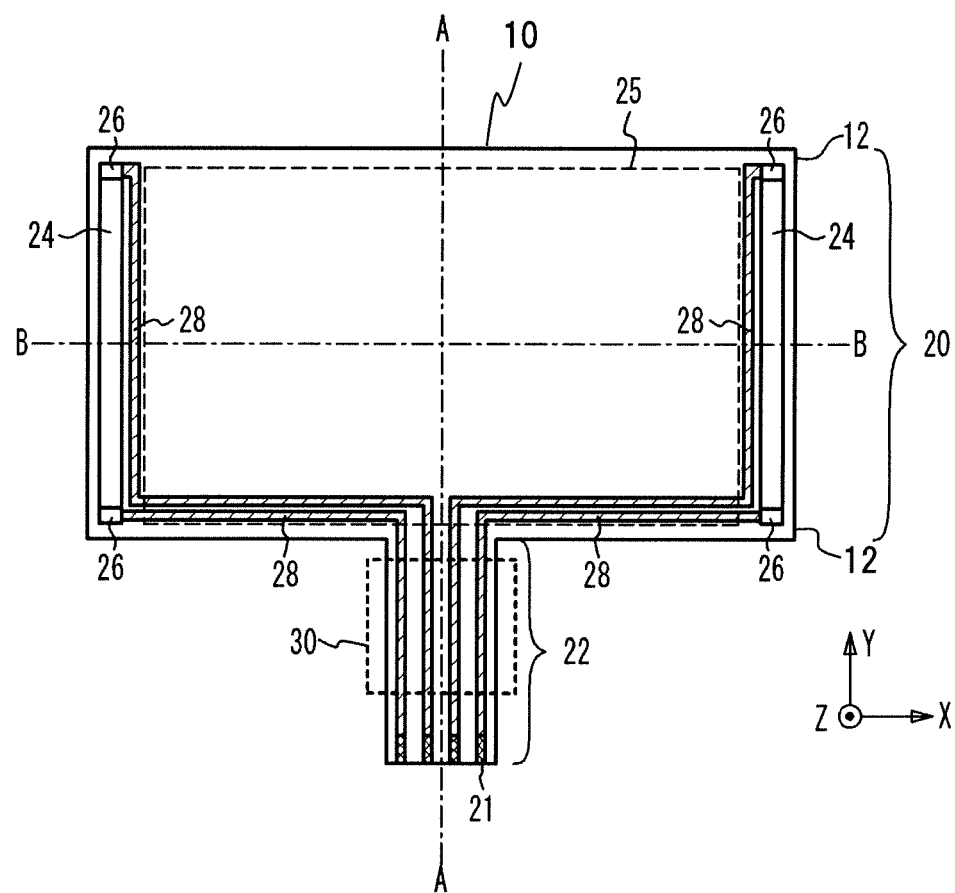
FIG. 3 is a plane view of a substrate according to the first embodiment.

FIG. 3 is a plane view of the substrate according to the first embodiment. The piezoelectric elements 24 provided at both ends of the vibration plate 20 are extended in the Y-direction, as illustrated in FIG. 3. Electrodes 26 are provided at both ends of each piezoelectric element 24 in the Y-direction. The electrodes 26 are electrically connected to the terminals 21 via wirings 28 provided on the back surface of the substrate 10. The terminals 21 are electrically connected to the housing 16 via the connector 18. When an alternating current (AC) signal is applied to the pair of electrodes 26 through the wirings 28, each piezoelectric element 24 vibrates, and a standing wave of an ultrasonic band is generated in the X-direction of a vibration region 25.

When the surface of the vibration plate 20 vibrates in an ultrasonic band of 25 to 40 kHz for example, and a part of a human body, e.g. a finger is trying to touch the surface of the vibration plate 20, a high pressure air layer occurs between the finger and the vibration plate 20. For this reason, a friction between the finger and the vibration plate 20 is reduced. This effect is called a squeeze effect. Thereby, a user feels a slippery feeling with the finger. When the generation and non-generation of the vibration is periodically repeated in the vibration region 25, the user feels a rough or irregularity feeling. Thus, by applying the ultrasonic vibration to the vibration plate 20, it is possible to present a tactile feeling to the user.

The terminal plate 22 leads the wirings 28 from the vibration plate 20 to the terminals 21. The width of the terminal plate 22 in the X direction is required such that the wirings 28 can be provided on the terminal plate 22. The width of the vibration plate 20 in the X direction is, for example, several tens to several hundreds mm, and the width of the terminal plate 22 in the X direction is, for example, 10 mm.

From the viewpoint of the ultrasonic vibration, a glass plate, a composite substrate such as a glass fiber substrate like FR4 (Flame Retardant Type 4), or a metal plate such as an iron plate can be used as the substrate 10. Each fixing member 12 is made of a hard material such as a metal like brass or stainless steel, or a glass, for example. The housing 16 is made of a material that can maintain a certain shape at the time of use, such as a resin like ABS (Acrylonitrile Butadiene Styrene), or a metal. The fixing member 12 and the housing 16 are rigid bodies.

The piezoelectric element 24 vibrates by the AC signal. The electrode 26 electrically connects the wiring 28 and the piezoelectric element 24 to each other, and is made of a metal layer such as a copper layer, a silver layer or a gold layer, for example. The wiring 28 is made of the metal layer such as the copper layer, the silver layer or the gold layer, and is a silver paste, for example. The piezoelectric element 24, the electrode 26 and the wiring 28 may be provided on a front surface of the substrate 10. The terminal 21 is made of plated metal layers such as gold layers or nickel layers provided on both surfaces of the substrate 10. The terminal 21 may be thicker than the wiring 28.

Figure 4:
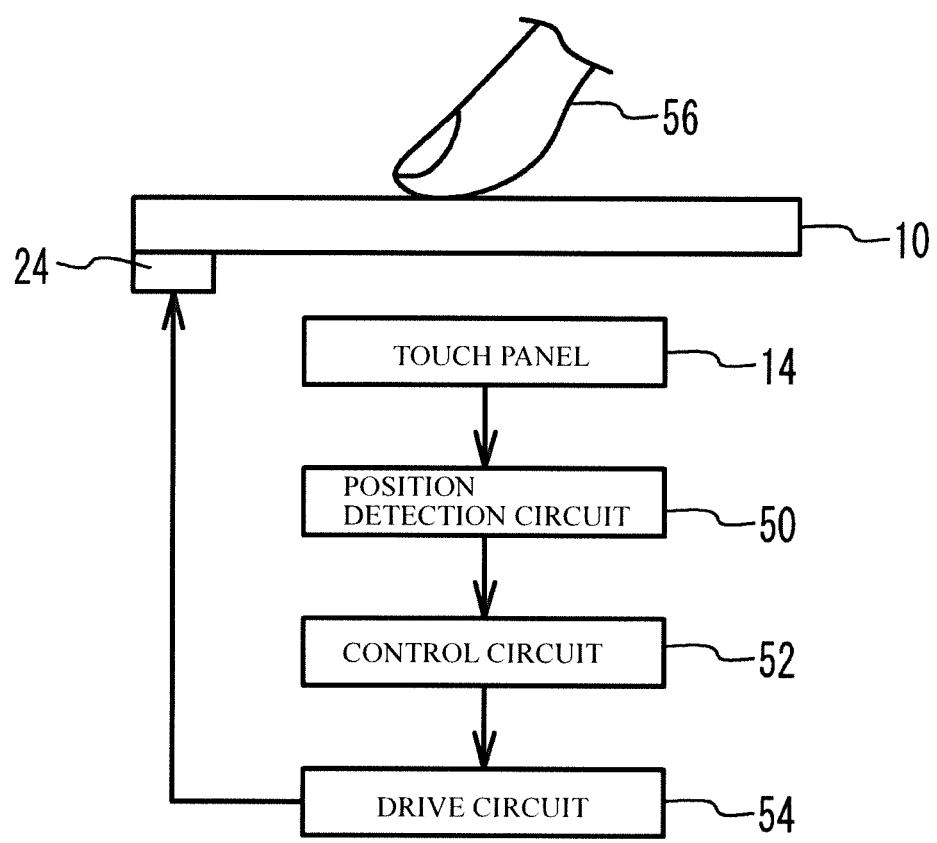
FIG. 4 is a block diagram of the tactile presentation device according to the first embodiment.

FIG. 4 is a block diagram of the tactile presentation device according to the first embodiment. The touch panel 14 is provided under the substrate 10 as illustrated in FIG. 4. The touch panel 14 can detect the position of a finger 56 touched on the substrate 10. When the finger 56 touches the surface of the substrate 10, a position detection circuit 50 detects the coordinates of the touch panel 14 which the finger 56 touches. A control circuit 52 controls on and off of the AC signal to be applied to the piezoelectric element 24 depending on a detection result of the position detection circuit 50. A drive circuit 54 applies or does not apply the AC signal to the piezoelectric element 24 via the connector 18, the terminal 21 and the wiring 28 depending on the control of the control circuit 52. Thereby, the user feels the tactile feeling with the finger. The position detection circuit 50, the control circuit 52 and the drive circuit 54 may be provided in the touch panel 14 or may be housed in the housing 16. The respective circuits 50, 52 and 54 may be provided in an information terminal on which the touch panel 14 is mounted. Each of the substrate 10 and the touch panel 14 has a permeability in which a visible light is transmitted, and a display may be provided under the touch panel 14.

When the vibration of the vibration plate 20 is transmitted to the housing 16 via the terminal plate 22 and the connector 18, discomfort is given to the user with the housing 16. It is also conceivable that the vibration plate 20 and the connector 18 are connected with a member which hardly transfers the vibration such as a flexible printed circuit board (FPC). However, when the FPC is used, there are problems that a cost increases, the number of contact points between the vibration plate 20 and the connector 18 increases, the manufacturing process increases, and the FPC may be disconnected by the vibration.

On the other hand, when the vibration plate 20 and the terminal plate 22 are formed integrally, there are advantages that the cost of the substrate 10 can be reduced, a contact point with the vibration plate 20 can be formed by only the connector 18, the manufacturing process does not increase, and the possibility of disconnection is low. The vibration plate 20 and the terminal plate 22 which are integrally formed constitute the substrate 10 made of a single rigid body. The vibration plate 20 and the terminal plate 22 share a layer made of the same material. The vibration plate 20 and the terminal plate 22 are located in the same plane.

In the first embodiment, the substrate 10 includes the vibration plate 20 and the terminal plate 22 which are integrally formed, as illustrated in FIG. 3. The piezoelectric elements 24 are provided on the vibration plate 20, and generate the standing wave of the ultrasonic band on the surface of the vibration plate 20 which the human body can touch. The terminals 21 are provided on the end of the terminal plate 22, and electrically connect the piezoelectric elements 24 to an external device or a processor. One of the fixing members 12 near the terminal plate 22 fixes the substrate 10 to the housing 16 between the vibration plate 20 and the terminals 21. In such a configuration, a vibration suppressor 30 for suppressing the ultrasonic vibration transmitted from the vibration plate 20 to the terminals 21 is provided between the terminals 21 and the fixing member 12. Thereby, it is possible to suppress the vibration transmitted from the vibration plate 20 to the terminals 21.

Second Embodiment

Figure 5A:
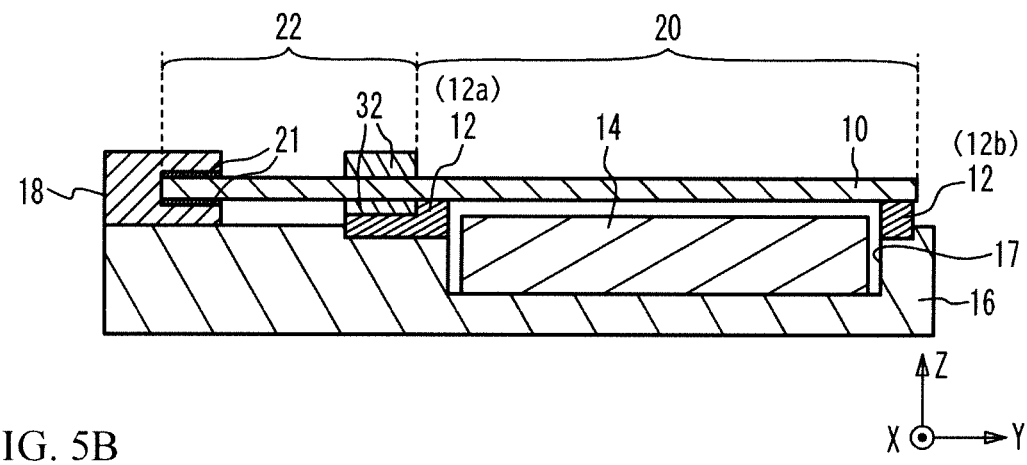
FIGS. 5A to 5C are cross-section diagrams of the tactile presentation device according to a second embodiment, and a first variation and a second variation thereof.
Figure 5B:
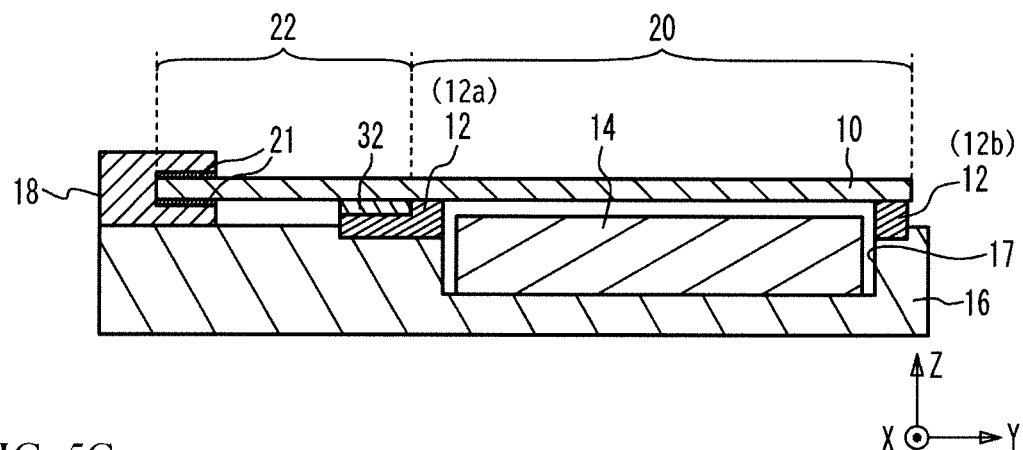
Figure 5C:
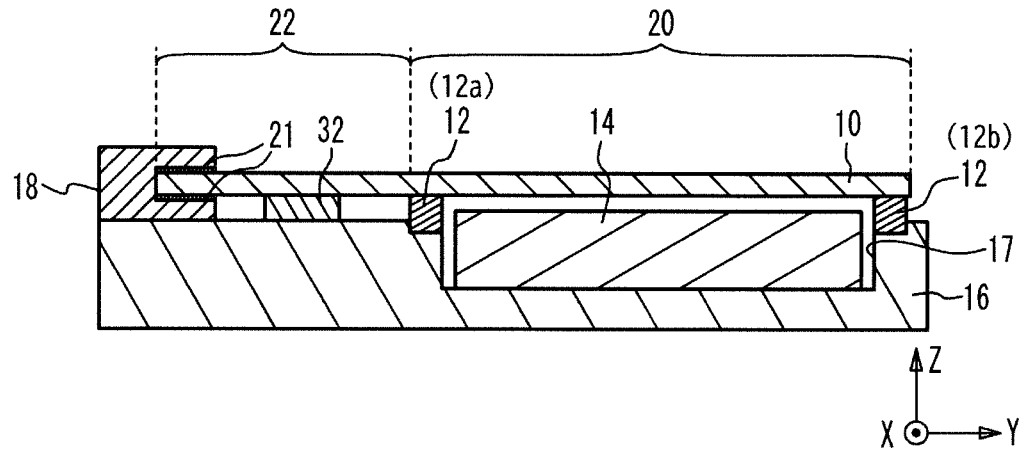

FIGS. 5A to 5C are cross-section diagrams of the tactile presentation device according to a second embodiment, and a first variation and a second variation thereof. In the second embodiment illustrated in FIG. 5A, an absorbing member 32 is provided on the fixing member 12 near the terminal plate 22 so as to sandwich the substrate 10. Hereinafter, the fixing member 12 near the terminal plate 22 is referred to as "a first fixing member 12a", and the fixing member 12 away from the terminal plate 22 is referred to as "a second fixing member 12b". The absorbing member 32 is provided on the terminal plate 22 having a width in the X-direction smaller than a width of the vibration plate 20. Also, the absorbing member 32 is fixed to the first fixing member 12a. The other configurations of the tactile presentation device in the second embodiment are the same as those of the tactile presentation device in the first embodiment, and therefore description thereof is omitted.

(First Variation of Second Embodiment)

In a first variation of the second embodiment illustrated in FIG. 5B, the absorbing member 32 is provided between the substrate 10 and the first fixing member 12a, and a part of the absorbing member 32 is not provided on an upper surface of the substrate 10. The other configurations of the tactile presentation device in the first variation are the same as those of the tactile presentation device in the second embodiment, and therefore description thereof is omitted.

(Second Variation of Second Embodiment)

In a second variation of the second embodiment illustrated in FIG. 5C, the absorbing member 32 is provided away from the terminals 21 and the first fixing member 12a. The absorbing member 32 is provided between the substrate 10 and the housing 16, and is fixed to the housing 16. The part of the absorbing member 32 is not provided on an upper surface of the substrate 10. The other configurations of the tactile presentation device in the second variation are the same as those of the tactile presentation device in the first variation of the second embodiment, and therefore description thereof is omitted. Also in the second variation, the absorbing member 32 may be provided so as to sandwich the substrate 10.

(Third Variation of Second Embodiment)

Figure 6:
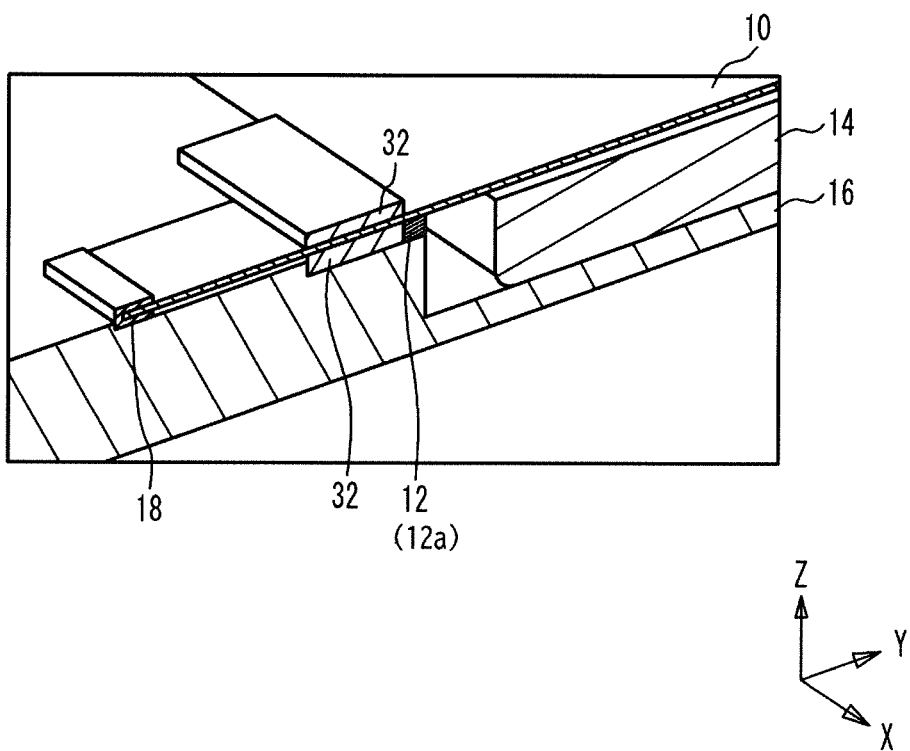
FIG. 6 is a perspective view of the tactile presentation device according to a third variation of the second embodiment.

FIG. 6 is a perspective view of the tactile presentation device according to a third variation of the second embodiment. In the third variation of the second embodiment illustrated in FIG. 6, the absorbing member 32 is in contact with the first fixing member 12a, and is provided on the housing 16. The absorbing member 32 is provided so as to sandwich the substrate 10. The other configurations of the tactile presentation device in the third variation are the same as those of the tactile presentation device in the second embodiment, and therefore description thereof is omitted.

In the second embodiment and the first to third variations thereof, the absorbing member 32 absorbs the ultrasonic vibration. A material that easily absorbs the ultrasonic vibration includes polyethylene terephthalate (PET), liquid crystal polymer (LCP), acrylic resin (e.g. PMMA: polymethyl methacrylate), polybutylene terephthalate (PBT), polycarbonate (PC), cycloolefin polymer (COP), polyethylene (PE) or polypropylene (PP), for example.

According to the second embodiment and the first to third variations thereof, the absorbing member 32 for absorbing the vibration of the standing wave generated in the vibration plate 20 serves as the vibration suppressor 30. Thereby, it is possible to suppress the ultrasonic vibration transmitted from the vibration plate 20 to the terminals 21.

As described in the second embodiment and the first variation thereof, the absorbing member 32 may be provided so as to mechanically connect the first fixing member 12a and the substrate 10. Moreover, as described in the second and the third variations of the second embodiment, the absorbing member 32 may be provided so as to mechanically connect the substrate 10 and the housing 16 between the first fixing member 12a and the terminals 21.

Third Embodiment

Figure 7A:
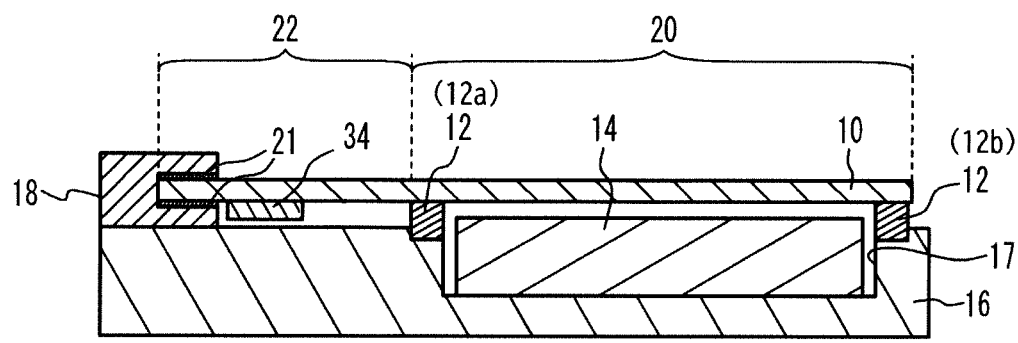
FIGS. 7A and 7B are cross-section diagrams of the tactile presentation device according to a third embodiment and a first variation thereof.
Figure 7B:
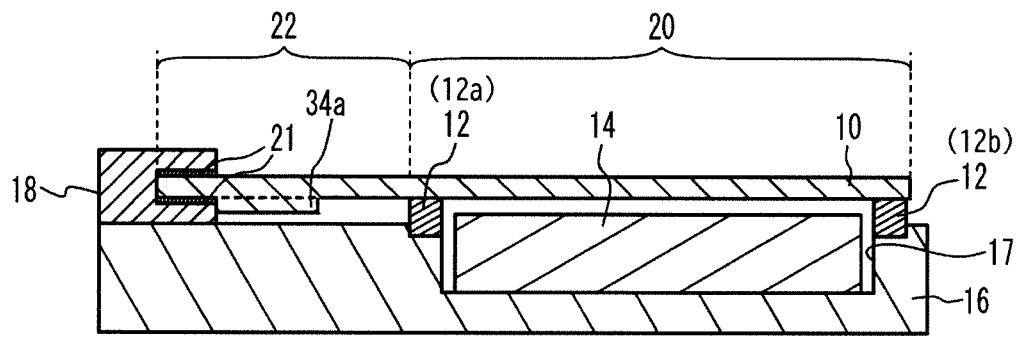

FIGS. 7A and 7B are cross-section diagrams of the tactile presentation device according to a third embodiment and a first variation thereof. A weight 34 is provided between the first fixing member 12a and the terminals 21 of the terminal plate 22 illustrated in FIG. 7A. The weight 34 is not in contact with the housing 16, and a gap is formed between the weight 34 and the housing 16. The weight 34 is made of material having higher density than the substrate 10 for example, and is a metal such as iron or copper. The weight 34 may be provided on at least one of the front surface and the back surface of the terminal plate 22. The other configurations of the tactile presentation device in the third embodiment are the same as those of the tactile presentation device in the first embodiment, and therefore description thereof is omitted.

(First Variation of Third Embodiment)

In the first variation of the third embodiment illustrated in FIG. 7B, the terminal plate 22 includes a thickness part thicker than the vibration plate 20, and the thickness part serves as a weight 34a. The other configurations of the tactile presentation device in the first variation of the third embodiment are the same as those of the tactile presentation device in the third embodiment, and therefore description thereof is omitted.

The vibration plate 20 vibrates between the two fixing members 12 fixed to the housing 16, and the terminal plate 22 vibrates between the first fixing member 12a and the connector 18 which are fixed to the housing 16. At this time, when a resonance frequency of the vibration plate 20 is the same as or close to that of the terminal plate 22, the vibration of the vibration plate 20 is propagated to the terminal plate 22, and the terminal plate 22 also vibrates. Therefore, the weight 34 is provided on the terminal plate 22 in order to shift the resonance frequency of the terminal plate 22 from the resonance frequency of the vibration plate 20. The resonance frequency of the terminal plate 22 differs from that of the vibration plate 20, and the weight 34 is disposed near the connector 18 away from the first fixing member 12a. Therefore, the terminal plate 22 is hardly to vibrate even when the vibration plate 20 vibrates. Thus, according to the third embodiment and the first variation thereof, the weight 34 provided on the terminal plate 22 serves as the vibration suppressor 30 to suppress the vibration of the terminal plate 22. Further, since the terminal plate 22 is heavy by the weight 34, it is possible to expect an effect that the terminal plate 22 is hardly to vibrate by the weight.

As described in the third embodiment, when a density of the weight 34 is greater than that of the substrate 10, it is possible to reduce a volume of weight 34.

As described in the first variation of the third embodiment, the part of the substrate 10 that is thicker than the vibration plate 20 can serve as the weight 34.

Fourth Embodiment

FIGS. 8A to 8F are cross-section diagrams of the terminal plate 22 of the tactile presentation device according to a fourth embodiment. Each of the terminal plates 22 illustrated in FIGS. 8A to 8F has a thin part 36 thinner than the vibration plate 20 as at least a part of the terminal plate 22.

Figure 8A:
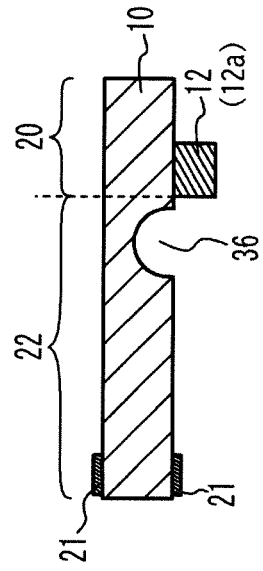
FIGS. 8A to 8F are cross-section diagrams of a terminal plate of the tactile presentation device according to a fourth embodiment.
Figure 8B:
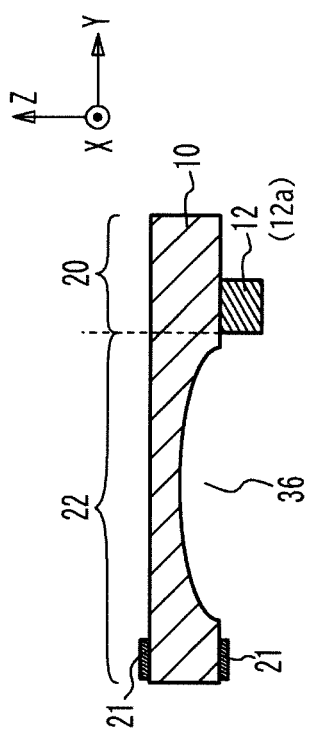

In FIGS. 8A and 8B, the thin part 36 is provided on a part of the terminal plate 22 which has the same thickness as the vibration plate 20 and is located between the terminals 21 and the first fixing member 12a. In FIG. 8A, almost all areas between the terminals 21 and the first fixing member 12a is the thin part 36. In FIG. 8B, the thin part 36 is formed on the terminal plate 22 near the first fixing member 12a. A part of the terminal plate 22 sandwiched between the terminals 21 has the same thickness as the vibration plate 20.

Figure 8C:
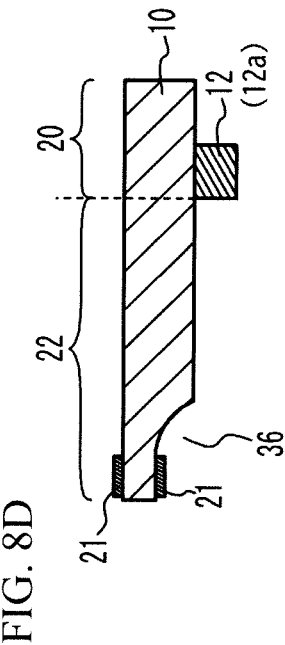
Figure 8D:
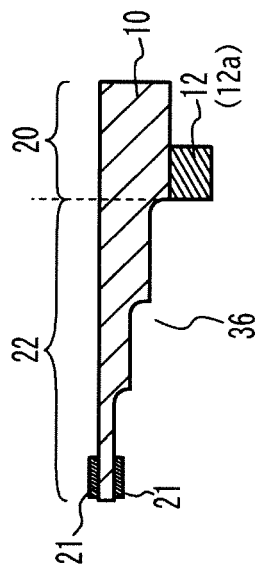
Figure 8E:
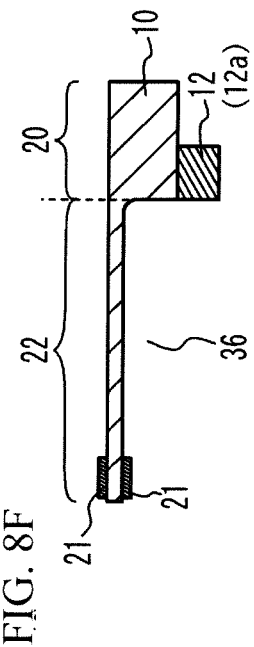
Figure 8F:
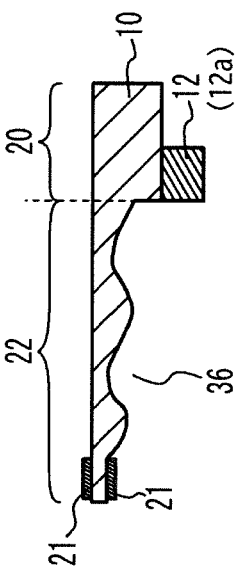

In FIGS. 8C to 8F, the part of the terminal plate 22 sandwiched between the terminals 21 has a thickness thinner than the vibration plate 20. In FIG. 8C, the thin part 36 of the terminal plate 22 is thinned stepwise toward the terminals 21 from the fixing member 12a. In FIG. 8D, the thickness of the terminal plate 22 near the first fixing member 12a is the same as that of the vibration plate 20, and the thin part 36 is provided on the terminal plate 22 near the terminals 21. In FIG. 8E, the shape of the thin part 36 of the terminal plate 22 is a waveform. In FIG. 8F, almost all region of the terminal plate 22 is the thin part 36, and the thickness of the terminal plate 22 is substantially constant.

Figure 9:
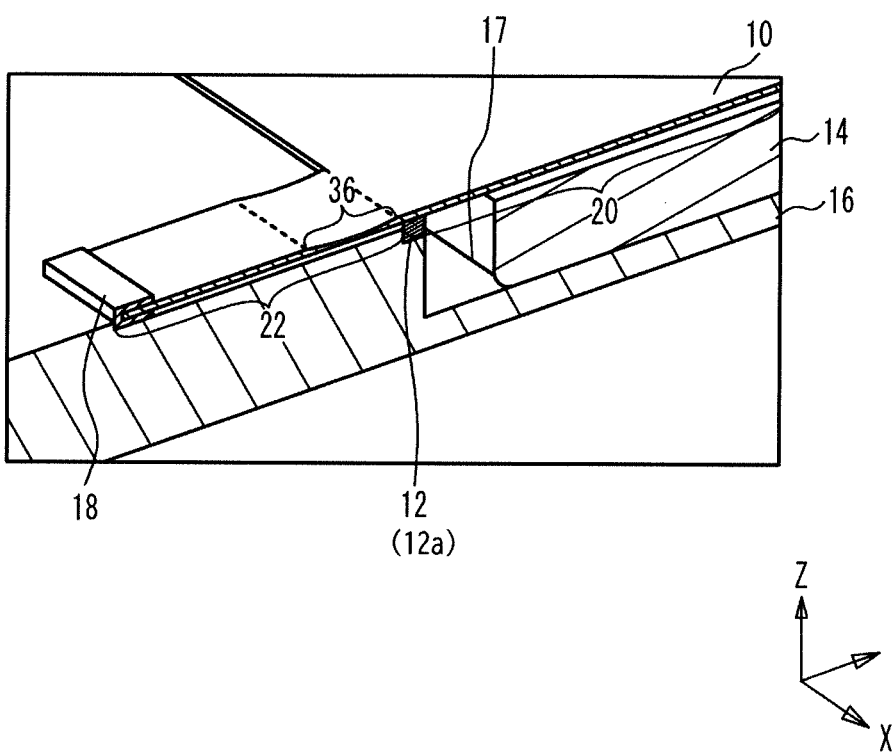
FIG. 9 is a perspective view illustrating a cross-section surface of the terminal plate according to the fourth embodiment.

FIG. 9 is a perspective view illustrating a cross-section surface of the terminal plate 22 according to the fourth embodiment. As illustrated in FIG. 9, the thin part 36 is provided on the terminal plate 22 near the first fixing member 12a. The thin part 36 is provided on the front surface of the substrate 10. The thin part 36 is not provided on the terminal plate 22 near the terminals 21, and the terminal plate 22 has substantially the same thickness as the vibration plate 20.

In the fourth embodiment, since the rigidity of the thin part 36 of the substrate 10 is reduced, the ultrasonic vibration is absorbed and suppressed by the thin part 36. It is preferable that the thickness of the thin part 36 is ¾ or less and ¼ or more of the thickness of the vibration plate 20, for example. The thin part 36 needs to be provided on at least one of the front surface and the back surface of the terminal plate 22.

According to the fourth embodiment, the vibration suppressor 30 constitutes a part of the substrate 10, and the thin part 36 thinner than the vibration plate 20 serves as the vibration suppressor 30. Thereby, it is possible to suppress the transmission of the ultrasonic vibration from the vibration plate 20 to the terminals 21. Since the terminal plate 22 is flexible, the work of inserting the terminals 21 into the connector 18 is facilitated.

In FIGS. 8A and 8B, the part of the terminal plate 22 sandwiched between the terminals 21 is thicker than the thin part 36. Thus, it is possible to improve a mechanical strength of the part of the terminal plate 22 sandwiched between the terminals 21.

In FIGS. 8C to 8F, the part of the terminal plate 22 sandwiched between the terminals 21 is thinner than the vibration plate 20. Thereby, it is possible to more suppress the transmission of the vibration from the vibration plate 20 to the terminals 21.

Fifth Embodiment

FIGS. 10A to 11C are plane views of the terminal plate 22 of the tactile presentation device according to a fifth embodiment.

As illustrated in FIG. 10A, a narrow part 38 constituting a part of the substrate 10 is provided on the terminal plate 22 near the first fixing member 12a. The narrow part 38 is formed at the root of the terminal plate 22 extending from the vibration plate 20. The width of the narrow part 38 in the X-direction is smaller than the width of a part of terminal plate 22 where the terminals 21 are provided. Since the rigidity of the narrow part 38 is reduced, the narrow part 38 suppresses the transmission of the ultrasonic vibration and serves as the vibration suppressor.

As illustrated in FIG. 10B, a wide part 39 having a width in the X-direction wider than the part of the terminal plate 22 where the terminals 21 are provided is provided on the terminal plate 22 near the first fixing member 12a. The width of the wide part 39 is continuously reduced toward the −Y-direction. Thereby, the terminal plate 22 becomes flexible as approaching the terminals 21, and can suppress the vibration.

Although the width of the terminal plate 22 in the X-direction is substantially constant as illustrated in FIGS. 10C to 10F, at least one opening 40 is provided on the terminal plate 22. In FIG. 10C, a single opening 40 is provided between two central wirings 28 among four wirings 28. The opening 40 is provided in the center of the terminal plate 22. In FIG. 10D, a plurality of openings 40 are provided between four respective wirings 28. The openings 40 are provided on the terminal plate 22 in a matrix shape. In FIG. 10E, a single slit-like opening 40 is provided between four respective wirings 28. In FIG. 10F, ladder-like openings 40 are provided between two central wirings 28 among the four wirings 28.

The terminal plate 22 including at least one opening 40 serves as the vibration suppressor 30. Since the rigidity of the part of the terminal plate 22 where the at least one opening 40 is provided is reduced, the transmission of the ultrasonic vibration is suppressed by this part of the terminal plate 22.

Figure 11A:
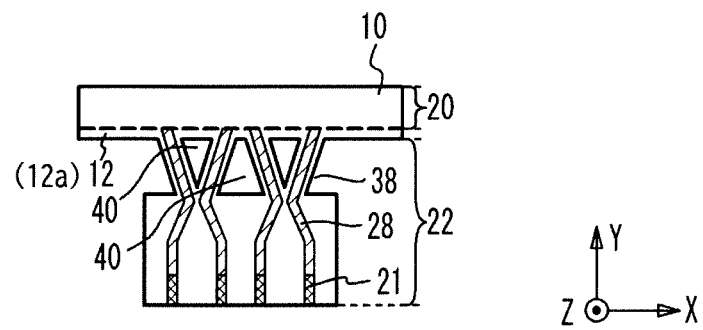
FIGS. 11A to 11C are plane views of the terminal plate of the tactile presentation device according to the fifth embodiment.
Figure 11B:
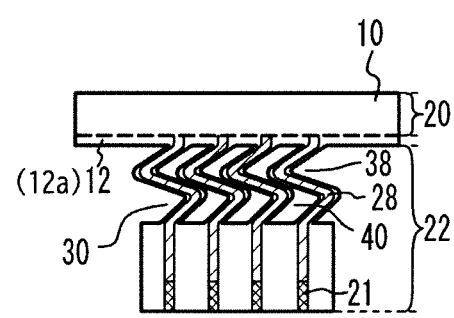
Figure 11C:
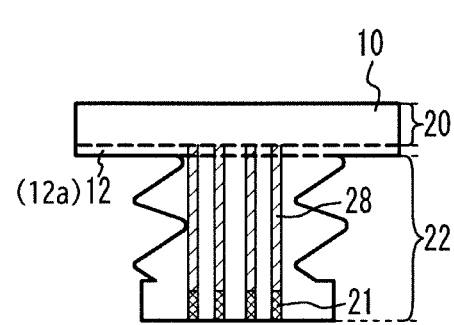

In FIG. 11A, the openings 40 and the narrow parts 38 are provided on the terminal plate 22, and a part of the terminal plate 22 has a truss shape. In FIG. 11B, the openings 40 and the narrow parts 38 are provided on the terminal plate 22, and a part of the terminal plate 22 has a plurality of spring shapes. In FIG. 11C, the terminal plate 22 has a meandering shape. By these configurations, the transmission of the ultrasonic vibration is suppressed.

One of the configurations of FIGS. 8A to 8F in the fourth embodiment may be appropriately combined with any of the configurations of FIGS. 10A to 11C in the fifth embodiment. For example, the thin part 36 may be narrow like the narrow part 38.

Sixth Embodiment

Figure 12:
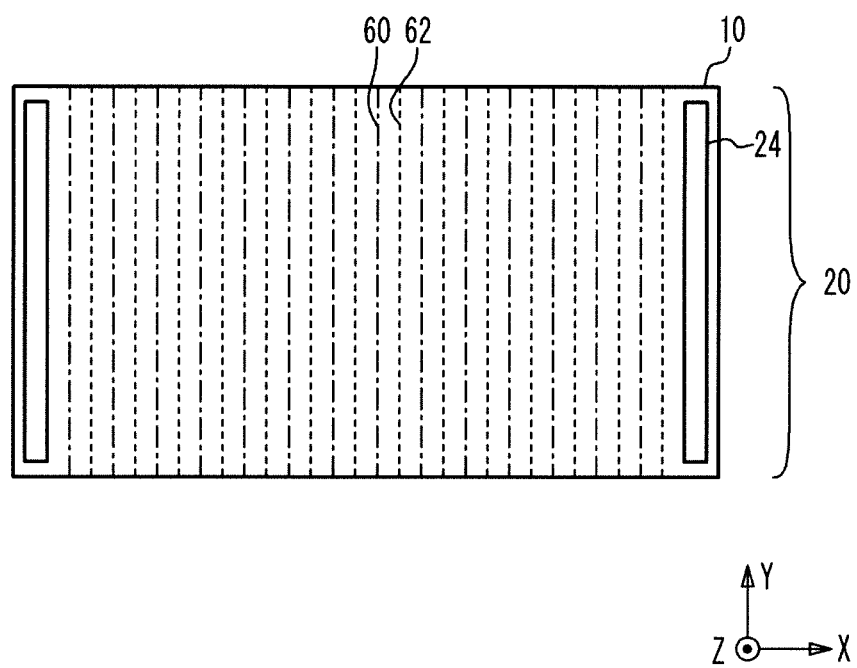
FIG. 12 is a plane view illustrating a vibration plate.

FIG. 12 is a plane view illustrating the vibration plate 20. When the standing wave is generated in the vibration plate 20 as illustrated in FIG. 12, nodes 60 and antinodes 62 of the standing wave alternately appear between the piezoelectric elements 24 in the X-direction. An interval between the adjacent nodes 60 is ½ of a wavelength of the standing wave, and an interval between the node 60 and the antinode 62 adjacent to each other is ¼ of a wavelength of the standing wave.

Figure 13:
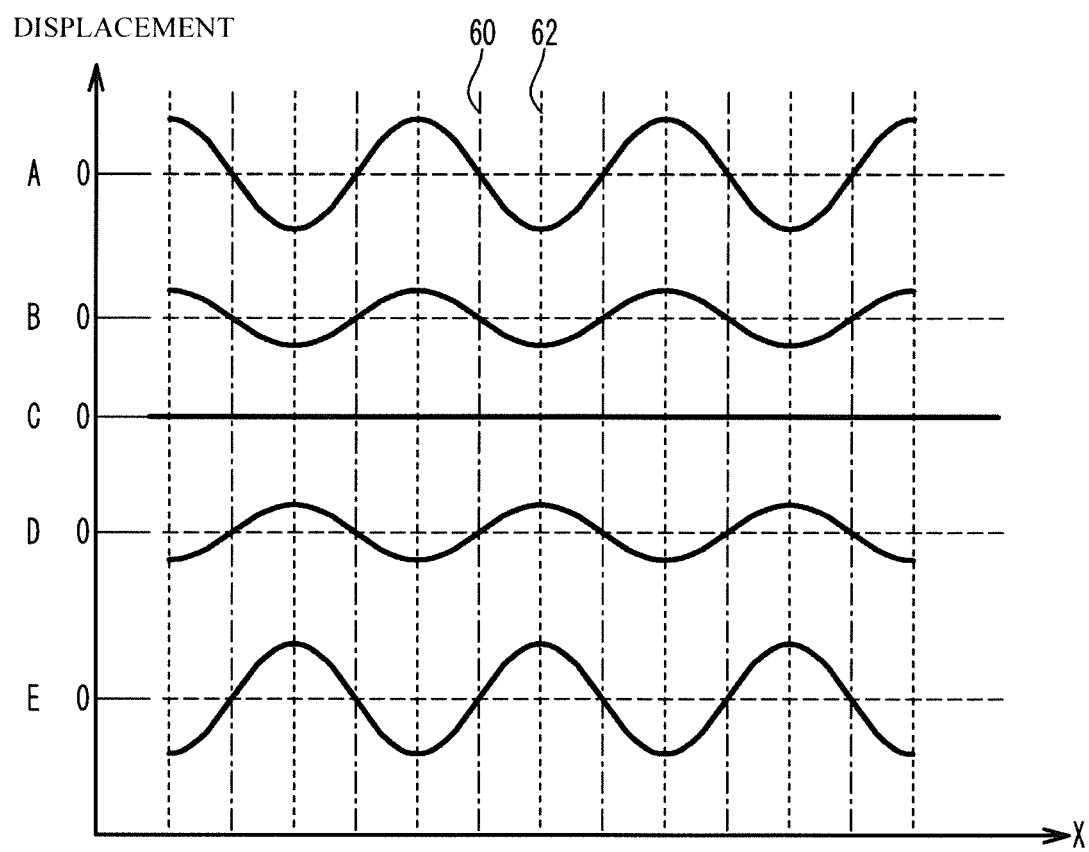
FIG. 13 is a diagram illustrating the vibration of a standing wave by using a displacement with respect to a position X.

FIG. 13 is a diagram illustrating the vibration of the standing wave by using a displacement with respect to each position on the vibration plate 20 in the X-direction. Marks "A" to in FIG. 13 denote time variation of the displacement. A vertical axis denotes an amplitude, and a horizontal axis denotes a position X. Each alternate long and short dash line denotes the node 60, and each dotted line denotes the antinode 62. The node 60 and the antinode 62 are alternately generated. The vibration changes in the order of A, B, C, D, E, D, C, B and A. As can be seen from FIG. 13, the displacement at the node 60 is 0 regardless of time, and this position does not vibrate. On the other hand, a displacement amount at the antinode 62 is the greatest. Adjacent antinodes 62 are displaced in a reverse phase.

Figure 14A:
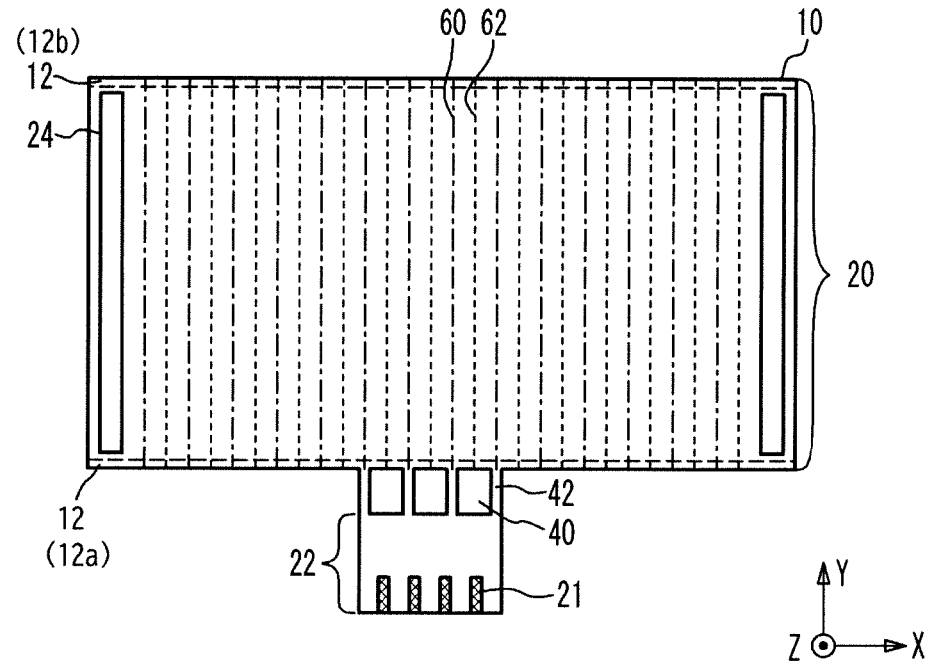
FIGS. 14A and 14B are plane views of the substrate according to a sixth embodiment.
Figure 14B:
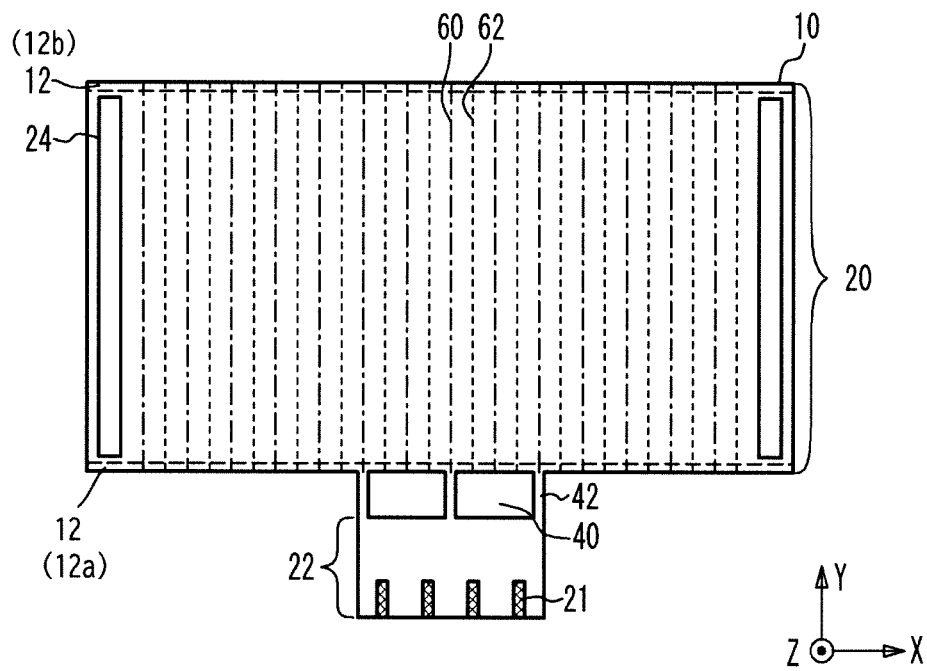

FIGS. 14A and 14B are plane views of the substrate 10 according to a sixth embodiment. As illustrated in FIGS. 14A and 14B, one or more rod members 42 which are a part of the substrate 10 are connected between the terminal plate 22 and the vibration plate 20. The rod members 42 are connected to portions of the vibration plate 20 corresponding to the nodes 60. On the other hand, the rod members 42 are not connected to portions of the vibration plate 20 corresponding to the antinodes 62, and the openings 40 are provided on the portions of the vibration plate 20 corresponding to the antinodes 62. The wirings 28 (not illustrated) are connected between the vibration plate 20 and the terminal plate 22 through any of the rod members 42. The other configurations of the tactile presentation device are the same as those of the tactile presentation device in the first embodiment, and therefore description thereof is omitted.

The rod members 42 may be provided at an interval between adjacent nodes 60 as illustrated in FIG. 14A, or may be provided on the portions of the vibration plate 20 corresponding to the nodes 60 skipping the adjacent node 60 as illustrated in FIG. 14B. When the wavelength of the standing wave is 10-12 mm, the interval between the nodes 60 is 5-6 mm. In order not to connect the rod members 42 to the portions of the vibration plate 20 corresponding to the antinodes 62 or in order not to pick up the vibration of the portions of the vibration plate 20 corresponding to the antinodes 62, the width of the rod member 42 in the X-direction is set to 1.5 mm or less, for example. It is preferable that the width of the rod member 42 is ⅛ or less of the wavelength of the standing wave. To ensure the mechanical strength of the rod member 42, the plurality of rod members 42 are preferably provided.

According to the sixth embodiment, the rod members 42 which connects the terminal plate 22 to the portions of the vibration plate 20 corresponding to the nodes 60 and are not connected to the portions of the vibration plate 20 corresponding to the antinodes 62 serve as the vibration suppressor 30. As illustrated in FIG. 13, the displacement of the vibration plate 20 at the nodes 60 is small. Therefore, the rod members 42 are connected to the portions of the vibration plate 20 corresponding to the nodes 60 and not connected to the portions of the vibration plate 20 corresponding to the antinodes 62, so that the transmission of the vibration is suppressed.

As illustrated in FIGS. 14A and 14B, the terminal plate 22 is connected to the portions of the vibration plate 20 corresponding to the nodes 60 via the rod members 42. Thereby, it is possible to increase a junction strength between the vibration plate 20 and the terminal plate 22 and suppress the transmission of the ultrasonic vibration from the vibration plate 20 to the terminal plate 22.

(First Variation of Sixth Embodiment)

Figure 15A:
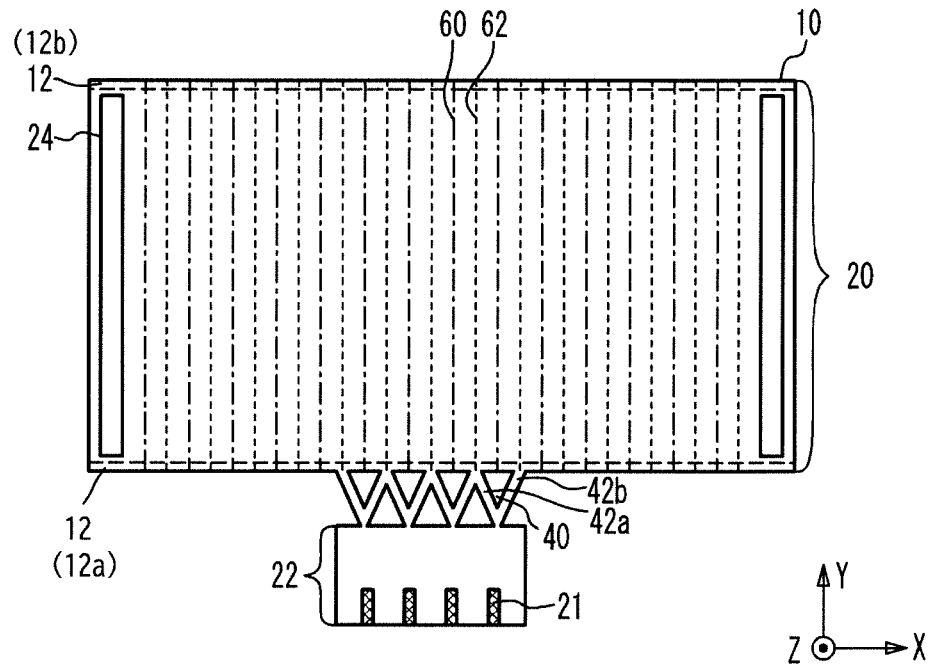
FIGS. 15A and 15B are plane views of the substrate according to a first variation of the sixth embodiment.
Figure 15B:
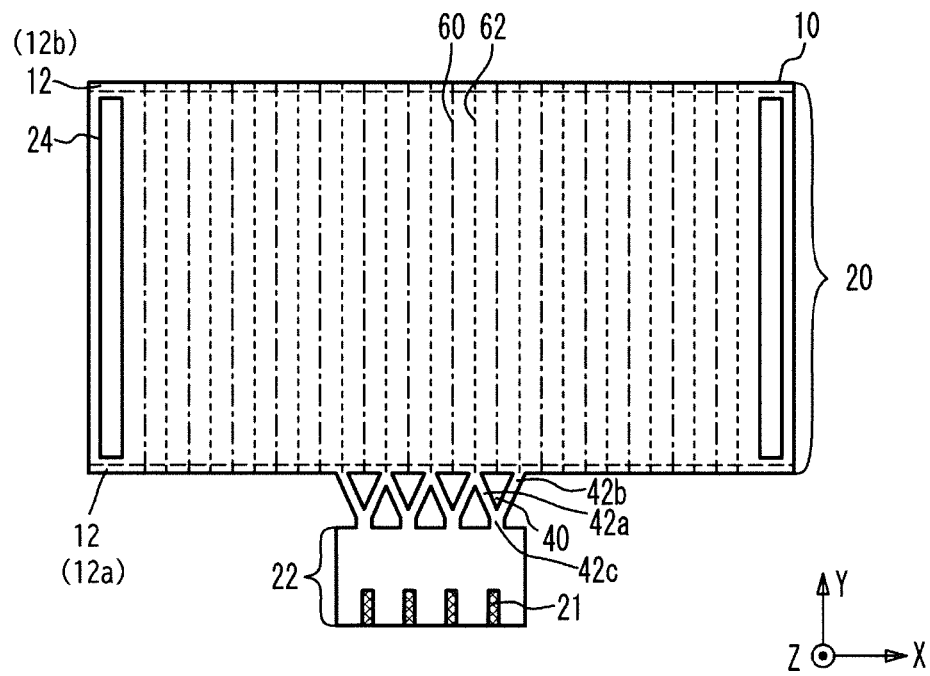

FIGS. 15A and 15B are plane views of the substrate 10 according to a first variation of the sixth embodiment. A plurality of rod members 42a and a plurality of rod members 42b are connected between the terminal plate 22 and the vibration plate 20, as illustrated in FIGS. 15A and 15B. A pair of rod members 42a and 42b are connected to portions of the vibration plate 20 corresponding to the adjacent antinodes 62, and connected to the same portion of the terminal plate 22. The wirings 28 (not illustrated) are connected between the vibration plate 20 and the terminal plate 22 through any of the rod members 42a to 42c. The other configurations of the tactile presentation device are the same as those of the tactile presentation device in the sixth embodiment, and therefore description thereof is omitted.

As illustrated in FIG. 15A, a planar shape of the pair of rod members 42a and 42b is a V-shape. As illustrated in FIG. 15B, the rod members 42a and 42b may be connected to the rod member 42c, and the rod member 42c may be connected to the terminal plate 22. The planar shape of the rod members 42a, 42b and 42c is a Y-shape.

According to the first variation of the sixth embodiment, the rod members 42a and 42b which connect the terminal plate 22 to the portions of the vibration plate 20 corresponding to the antinodes 62 of the reverse phase of the standing wave serve as the vibration suppressor 30. The rod members 42a and 42b are connected to each other near the terminal plate 22. The displacements of the vibration plate 20 in the adjacent antinodes 62 are the reverse phase, as illustrated in FIG. 13. For this reason, the rod members 42a and 42b are connected to the portions of the vibration plate 20 corresponding to the adjacent antinodes 62, and the rod members 42a and 42b are connected to each other near the terminal plate 22. Thereby, the vibrations of the reverse phase overlap with each other to be canceled, and therefore the vibration of the terminal plate 22 is suppressed.

The vibrations applied to the rod members 42a and 42b having one end connected to each other may be the reverse phase. On the other hand, even if the adjacent antinodes 62 are not the reverse phase, there is a case where the antinodes 62 of the reverse phase are present. For this reason, the portions of the vibration plate 20 to which the rod members 42a and 42b are connected may not necessarily be disposed at positions corresponding to the adjacent antinodes 62. Moreover, since it needs to apply other vibration of the reverse phase to cancel the vibration, as long as the vibration and the other vibration which is the reverse phase of the vibration can be applied to the rod members 42a and 42b, respectively, the rod members 42a and 42b can be connected to positions other than the portions of the vibration plate 20 corresponding to the antinodes 62.

The wavelength of the standing wave is determined by conditions such as the shape of the vibration plate 20, and a driving frequency for driving the piezoelectric elements 24. When the wavelength of the standing wave is determined, the positions of the nodes 60 and the antinodes 62 of the standing wave to be generated on the vibration plate 20 also are determined. Therefore, it is possible to determine the portions of the vibration plate 20 to be connected to the rod members 42a and 42b.

The planar shape of the pair of rod members 42a and 42b is the V-shape as illustrated in FIG. 15A or the Y-shape as illustrated in FIG. 15B. Thereby, it is possible to ensure the mechanical strength of the rod members 42a to 42c and cancel the vibrations of the reverse phase of the rod members 42a and 42b.

As in the sixth embodiment, it is preferable that each of the widths of the rod members 42a and 42b is ⅛ or less of the wavelength of the standing wave. To ensure the mechanical strength of the rod members 42a and 42b, the plurality pairs of rod members 42a and 42b are preferably provided.

The first to the sixth embodiments and its variations may be appropriately combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various change, substitutions, and alterations could be made hereto without departing from the spirit and scope of the invention.

What is claimed is:
1. A tactile presentation device comprising:
a substrate including a vibration plate and a terminal plate which are integrally formed;
an actuator that is provided on the vibration plate, and generates a standing wave of ultrasonic vibration;

a terminal that is provided on an end of the terminal plate, and electrically connects the actuator to an external device;

a fixing member that fixes the vibration plate to a support; and a vibration suppressor that is provided between the terminal and the fixing member, and suppresses the ultrasonic vibration transmitted from the vibration plate to the support.

2. The tactile presentation device according to claim 1, wherein the vibration suppressor is an absorbing member that absorbs the ultrasonic vibration.

3. The tactile presentation device according to claim 1, wherein the vibration suppressor is a weight provided on the terminal plate.

4. The tactile presentation device according to claim 1, wherein the vibration suppressor is a part of the terminal plate thinner than the vibration plate.

5. The tactile presentation device according to claim 1, wherein a width of the vibration suppressor differs from that of the end of the terminal plate on which the terminal is provided.

6. The tactile presentation device according to claim 1, wherein the vibration suppressor is a part of the terminal plate having an opening.

7. The tactile presentation device according to claim 1, wherein the vibration suppressor is a rod member, the rod member connecting the terminal plate to a portion of the vibration plate corresponding to a node of the standing wave and being not connected to a portion of the vibration plate corresponding to an antinode of the standing wave.

8. The tactile presentation device according to claim 1, wherein the vibration suppressor is a pair of rod members, the rod members connecting the terminal plate to portions of the vibration plate corresponding to antinodes of the standing wave, the antinodes being in a reverse phase with each other, the rod members being connected to each other near the terminal plate.

* * * * *